Figure 1:
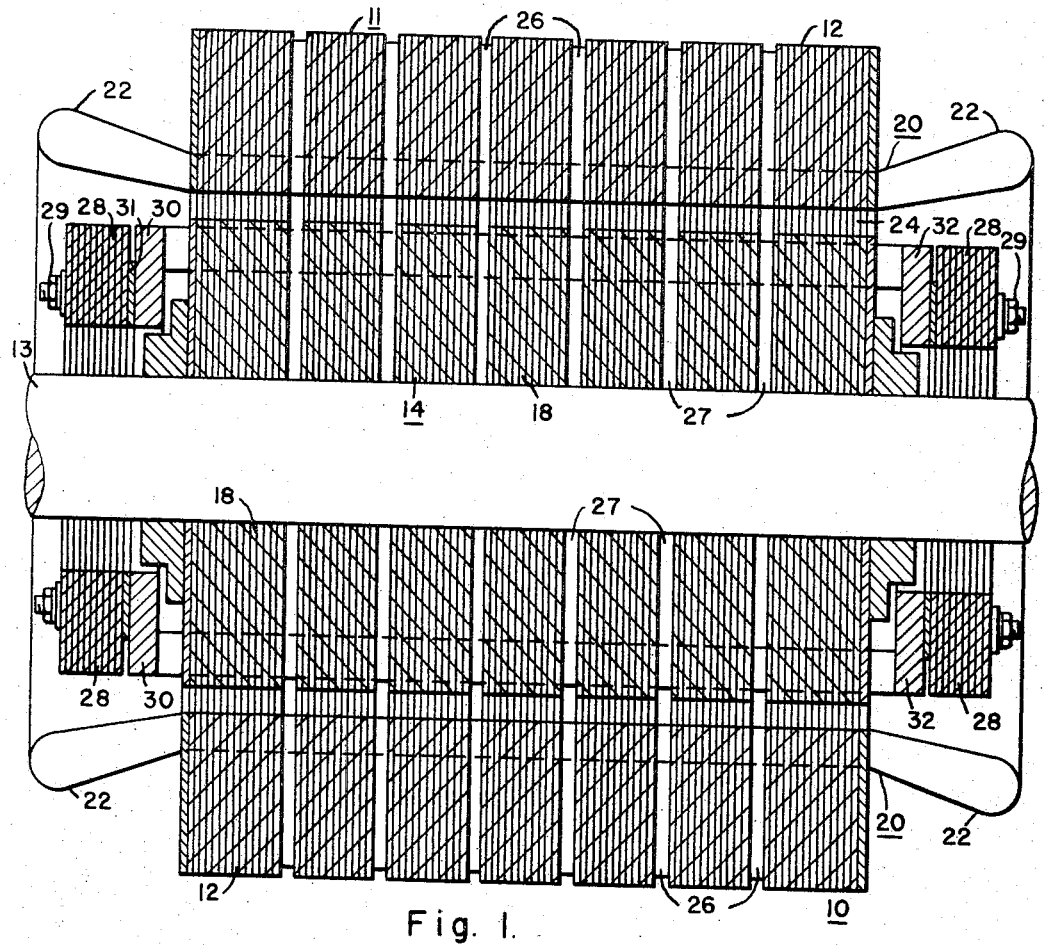

Aug. 8, 1967  R. C. ROBINSON  3,335,308
DYNAMOELECTRIC MACHINE HAVING MEANS FOR REDUCING
TORQUE AND INRUSH CURRENT
Filed May 5, 1964

INVENTOR
Robert C. Robinson
BY
ATTORNEY

United States Patent Office 3,335,308
Patented Aug. 8, 1967

3,335,308
DYNAMOELECTRIC MACHINE HAVING MEANS FOR REDUCING TORQUE AND INRUSH CURRENT
Robert C. Robinson, Wilkinsburg, Pa., assignor to Westinghouse Electric Corporation, East Pittsburgh, Pa., a corporation of Pennsylvania
Filed May 5, 1964, Ser. No. 364,967
5 Claims. (Cl. 310—211)

The present invention relates to dynamoelectric machines and more particularly to machines such as induction motors in which means are provided for reducing the torque and inrush current characteristics of the machine.

In manufacturing dynamoelectric machines, it is very often the case that normal operating ratings of torque and power are met but on test it is determined that starting inrush current, or starting or pull-out torque, is too high to meet customer or design specifications. Thus, a maximum value may be specified for inrush current in order to prevent excessive deregulation of line voltage on machine or motor start-up. Starting or pull-out torque on the other hand, may be limited to a maximum value because the machine may be intended for use with gears or other components which cannot be subjected to torques above the maximum stated value.

To conform the inrush current and torque characteristics of the manufactured machine with those specified, the machine stator can be rewound or the rotor of an induction motor can be rebarred. These are disadvantageously expensive and time consuming operations.

In accordance with the principles of the present invention, a dynamoelectric machine or induction motor is conveniently provided with desired inrush current and starting and pull-out torque characteristics by means of leakage magnetic core means or magnetic laminations secured, preferably insulatively, adjacent each end of the machine rotor. In this location, there is an increase in the leakage flux from the end turns of the stator windings and from the rotor conductor means or end rings. Increased leakage reactance in turn decreases the machine inrush current and starting and pull-out torques. The magnetic core means can be disposed as described in accordance with the original design of the machine, or it can be so disposed when and if tests indicate that a manufactured machine does not conform to specifications for inrush current and starting or pull-out torque.

It is therefore, an object of the invention to provide a novel dynamoelectric machine in which inrush current is conveniently reduced if it is determined to be too high.

Another object of the invention is to provide a novel dynamoelectric machine in which starting torque or pullout torque is conveniently reduced if it is determined to be too high.

A further object of the invention is to provide a novel induction motor in which leakage flux from stator windings and rotor end rings is conveniently increased when desired so as to decrease inrush current and starting torque or pull-out torque characteristics.

Figure 2:
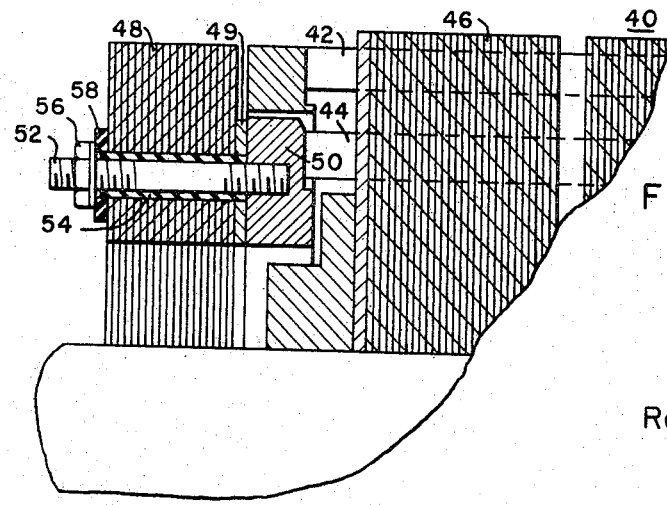

These and other objects of the invention will become more apparent upon consideration of the following detailed description along with the attached drawing, in which:

FIGURE 1 shows a portion of a longitudinal section of a dynamoelectric machine constructed in accordance with the principles of the invention; and FIGURE 2 shows a fragmentary view of a longitudinal section of another dynamoelectric machine in which the principles of the invention are embodied.

More specifically, there is shown in FIG. 1 a dynamoelectric machine 10 in the form of an induction motor having a suitable frame (not shown) on which there is disposed a stator 11 having a laminated annular magnetic stator core 12. Within the stator core 12, there is supported a suitable shaft 13 on which there is disposed a squirrel cage rotor 14 having a plurality of rotor cage bars extending longitudinally through slots (not shown) in a laminated magnetic rotor core 18. The stator 11 also includes stator windings 20 suitably disposed in the stator core 12 about the inner periphery thereof in accordance with well known techniques and having end turns 22 extending longitudinally outward of each end of the core 12. In this particular example, air ducts 26 and 27 are preferably provided respectively in the stator core 12 and the rotor core 14 so as to provide for ventilated heat removal from the motor 10 during its operation.

The stator windings 20 are preferably arranged for three-phase alternating current energization so as to produce a rotating magnetic field in air gap 24 between the stator 11 and the squirrel cage rotor 14. Motor action, that is rotation of the rotor 14 on its shaft, is thus produced in accordance with principles well known in the art.

The general operating characteristics such as rated operating torque, speed and power of a dynamoelectric machine or induction motor are provided by careful preliminary design of the machine geometry including the size and disposition of stator and rotor cores and conductors. However, as already described, it is very often the case that a machine must meet inrush current and start-up or pull-out torque specifications, and notwithstanding the fact that a manufactured machine meets the general operating characteristics it often fails under test conditions to meet the latter requirements.

When it is determined that the inrush current or the start-up torque or the pull-out torque (that is, the maximum torque developed during the start-up period) is excessive, leakage magnetic core means 28 (preferably laminated) are secured to each end of the machine rotor 14. The core means 28 can, if desired, by incorporated in the original machine design as a "built-in" or original determinant of such current and torque characteristics.

Preferably, the core means 28 comprise magnetic lamination rings secured, preferably in electrically insulative relation by fastener means 29 against or to each other and against insulative spacer 31 to respective rotor end rings 30 and 32. Since the rotor rings 30 and 32 are provided in the basic design of the induction motor 10 for the purpose of providing a path for circulating induced rotor currents, disposition of magnetic core means 28 on each end of the rotor 14 is conveniently achieved. In the case of other dynamoelectric machines, such as synchronous machines, leakage magnetic core means similar to the core means 28 can be employed to increase leakage reactance, but securance of the core means at each end of the machine rotor normally would be more complicated than in the case of an induction motor.

In start-up operation, the stator end turns 22 and rotor end rings 30 and 32 carry currents which produce more magnetic leakage flux adjacent each end region of the motor 10 because of the low reluctance leakage magnetic core means 28. Such leakage flux produces increased rotor and stator reactance which in turn decreases the inrush current and the start-up and pull-out torques during the start-up period.

The number and size of magnetic laminae in the core means 28 are determinative of the added flux leakage achieved, and the principal limiting factor is that the added flux leakage should not be so great as to carry over with a substantial adverse effect on the desired machine operating ratings of torque, speed, power and the like. In addition, of course, the added flux leakage which can theoretically be achieved in any given machine is limited by the total amount of space available in the rotor end regions of such machine.

As a further illustration of the invention, there is shown in FIG. 2 one rotor end portion of another induction motor 40 which in this case is provided with outer and inner rotor bars 42 and 44 disposed at different depths in slots provided in rotor core 46. Leakage magnetic core means 48 (preferably laminated) are secured against spacer 49 and to inner rotor end ring 50 by fastener means or stud(s) or bolt(s) 52 which preferably extend through the core means 48 in electrically insulative sleeve(s) 54. Electrical insulation of the core means 48 from the end ring 50 is preferred since it is desirable not to affect the rotor resistance with a circuit path through the core means 48. In some cases, however, the resistance of the laminated core means 48 may be sufficiently high so that the fastener means insulation may be eliminated with only nominal effect on the rotor resistance.

Lock nut 56 is secured to stud 52 so as to fix the magnetic core means 48 in secure position relative to the rotor end rings 50. Preferably, electrically insulative washer means 58 is disposed under lock nut 56 and about sleeve 54 so as to complete the insulation of the stud 52 and nut 56 from the magnetic core means 48.

The other end of the rotor 46 is constructed in a manner similar to the one end portion shown in FIG. 2, and the manner in which the motor 40 operates is similar to the operation described in connection with motor 10 of FIG. 1. The motor 40 has been constructed and tested and substantial decrease in inrush current and start-up and pull-out torque was achieved through the employment of the magnetic core means 48.

The foregoing disclosure has been presented only to point out the principles of the invention. Accordingly, it is desired that the invention be not limited by the embodiments described, but, rather, that it be accorded an interpretation consistent with the scope and spirit of its broad principles.

What is claimed is:

1. A dynamoelectric machine having a stator core, stator windings on the stator core, said stator windings having end turns extending beyond the ends of the stator core, a rotor member having a rotor core and a rotor winding on the rotor core, including annular end rings disposed adjacent each end of said rotor member, magnetic core means supported on each end of the rotor member outwardly of the rotor core and rotor winding, and physically separated from the rotor core by the annular end rings and by an insulating spacer disposed between the end rings and said magnetic core means, said magnetic core means being disposed in the path of leakage flux from the end turns of the stator winding, said magnetic core means providing a low reluctance path for the leakage flux so as to substantially increase stator leakage reactance during the start-up period.

2. A dynamoelectric machine having a stator core, stator windings on the stator core, said stator windings having end turns extending beyond the ends of the stator core, a rotor member having a rotor core and a rotor winding on the rotor core including end rings disposed adjacent each end of said rotor member, and magnetic core means supported on each end of the rotor member outwardly of the rotor core and rotor winding, said magnetic core means being electrically isolated and physically separated from the rotor core by the end rings and an insulating spacer disposed between the end rings and the magnetic core means and disposed in the path of leakage flux from the end turns of the stator winding, said magnetic core means providing a low reluctance path for the leakage flux so as to substantially increase stator leakage reactance during the start-up period.

3. A dynamoelectric machine as defined in claim 2 in which the magnetic core means comprises a plurality of annular laminations secured together and to the rotor member.

4. A dynamoelectric machine having a stator core, stator windings on the stator core, said stator windings having end turns extending beyond the ends of the stator core, a rotor member having a rotor core and a squirrel cage rotor winding on the rotor core, said rotor winding including annular end rings at each end of the rotor member, and magnetic core members supported on the outer sides of said end rings at each end of the rotor member, said magnetic core members being electrically and physically separated from the rotor member by the annular end rings and an insulating spacer disposed between the end rings and the magnetic core members, said magnetic core members being disposed in the path of leakage flux from the end turns of the stator winding, said magnetic core members providing a low reluctance path for the leakage flux so as to substantially increase stator leakage reactance during the start-up period.

5. A dynamoelectric machine as defined in claim 4 in which the magnetic core members comprise a plurality of annular laminations and means for securing the laminations together and to the outer sides of the end rings.

References Cited
UNITED STATES PATENTS

| | | | |
|---|---|---|---|
| 936,292 | 10/1909 | Bergman | 310—212 |
| 1,527,332 | 2/1925 | Rudemberg | 310—212 |
| 1,694,061 | 12/1928 | Hansen et al. | 310—212 |
| 2,748,333 | 5/1956 | Lee | 310—212 X |
| 2,788,458 | 4/1957 | Naul | 310—212 |

MILTON O. HIRSHFIELD, *Primary Examiner.*

L. L. SMITH, *Assistant Examiner.*